United States Patent
Tanaka

(10) Patent No.: US 12,270,718 B2
(45) Date of Patent: Apr. 8, 2025

(54) PASTE-LIKE COMPOSITION FOR PRESSURE MEASUREMENT AND PRESSURE MEASUREMENT METHOD

(71) Applicant: FUJIFILM Corporation, Tokyo (JP)

(72) Inventor: Satoshi Tanaka, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 751 days.

(21) Appl. No.: 17/467,259

(22) Filed: Sep. 5, 2021

(65) Prior Publication Data

US 2021/0396609 A1  Dec. 23, 2021

Related U.S. Application Data

(63) Continuation of application No. PCT/JP2020/003195, filed on Jan. 29, 2020.

(30) Foreign Application Priority Data

Mar. 26, 2019 (JP) ................. 2019-057688
Jul. 16, 2019 (JP) ................. 2019-131068

(51) Int. Cl.
*G01L 1/24* (2006.01)
(52) U.S. Cl.
CPC .................... *G01L 1/247* (2013.01)
(58) Field of Classification Search
CPC ....................................... G01L 1/247
See application file for complete search history.

(56) References Cited

U.S. PATENT DOCUMENTS

| | | | |
|---|---|---|---|
| 10,442,886 B2 | 10/2019 | Yabu et al. | |
| 2004/0214134 A1 | 10/2004 | Hamilton et al. | |
| 2010/0184233 A1 | 7/2010 | Watanabe et al. | |
| 2017/0029625 A1 | 2/2017 | Stolarz, Jr. et al. | |

FOREIGN PATENT DOCUMENTS

| | | |
|---|---|---|
| CN | 101743461 | 6/2010 |
| CN | 101874199 | 10/2010 |
| CN | 107109212 | 8/2017 |
| CN | 109374165 | 2/2019 |
| JP | H05123347 | 5/1993 |
| JP | 2004116554 | 4/2004 |
| JP | 2007132756 | 5/2007 |
| JP | 2009019949 | 1/2009 |

OTHER PUBLICATIONS

Kobayashi et al., English machine translation of JP 2007132756A. (Year: 2007).*
"International Search Report (Form PCT/ISA/210) of PCT/JP2020/003195," mailed on Mar. 31, 2020, with English translation thereof, pp. 1-5.
"Written Opinion of the International Searching Authority (Form PCT/ISA/237)" of PCT/JP2020/003195, mailed on Mar. 31, 2020, with English translation thereof, pp. 1-8.
"Office Action of Japan Counterpart Application", issued on Dec. 7, 2021, with English translation thereof, p. 1-p. 5.
Office Action of China Counterpart Application, with English translation thereof, issued on Dec. 2, 2022, pp. 1-14.
"Office Action of China Counterpart Application", issued on Jun. 1, 2024, with English translation thereof, p. 1-p. 10.
Muroi Soichi, "Application of Polymer Emulsion in Architectural Coatings", Chemical Industry Press, Jul. 1988, with English abstract, pp. 1-5.
"Office Action of China Counterpart Application", issued on Jan. 4, 2024, with English translation thereof, p. 1-p. 16.
"Decision of Refusal of China Counterpart Application", issued on Sep. 14, 2023, with English translation thereof, pp. 1-17.
"Office Action of China Counterpart Application" with English translation thereof, issued on Apr. 27, 2023, p. 1-p. 18.
Office Action of Japan Counterpart Application, with English translation thereof, issued on Apr. 12, 2022, pp. 1-5.
"Office Action of China Counterpart Application", issued on Aug. 6, 2024, with English translation thereof, p. 1-p. 29.

* cited by examiner

*Primary Examiner* — Peter F Godenschwager
(74) *Attorney, Agent, or Firm* — JCIPRNET

(57) ABSTRACT

There are provided a paste-like composition for pressure measurement, including a microcapsule that encompasses an electron-donating dye precursor and an electron-accepting compound that causes the electron-donating dye precursor to develop a color, and a pressure measurement method using the paste-like composition for pressure measurement.

11 Claims, No Drawings

PASTE-LIKE COMPOSITION FOR PRESSURE MEASUREMENT AND PRESSURE MEASUREMENT METHOD

CROSS-REFERENCE TO RELATED APPLICATIONS

This application is a continuation application of International Application No. PCT/JP2020/003195, filed Jan. 29, 2020, the disclosure of which is incorporated herein by reference in its entirety. Further, this application claims priority from Japanese Patent Application No. 2019-057688, filed Mar. 26, 2019, and Japanese Patent Application No. 2019-131068, filed Jul. 16, 2019, the disclosures of which are incorporated herein by reference in their entirety.

BACKGROUND OF THE INVENTION

1. Field of the Invention

The present disclosure relates to a paste-like composition for pressure measurement and a pressure measurement method.

2. Description of the Related Art

In the related art, materials of which color tone changes in response to pressure have been known, and materials having various forms are used in various fields.

As a material for pressure measurement capable of realizing a density that can be visible or read with a minute pressure, JP2009-19949A proposes a material for pressure measurement, having a difference in color optical density ΔD of 0.02 or more before and after pressurization at 0.05 MPa, in which a color developing reaction between an electron-donating dye precursor and an electron-accepting compound is utilized. As a material for pressure measurement, in which such a color developing reaction is utilized, there is a pressure measurement film represented by PRESCALE (trade name; registered trade mark) provided by FUJIFILM Corporation.

As a material that is used for measuring a gap (a clearance) and a pressure of teeth in dental treatment, JP1993-123347A (JP-H5-123347A) discloses a clearance marker obtained by retaining two or more kinds of capsules having different breaking pressures in an elastic body, incorporating them in the layer, or retaining them in a jelly, a mousse, a paste, and the like, where the capsules are enclosed with colorants of different colors.

JP2004-116554A discloses a press-type tube joint in which a pressure-sensitive color developing zone consisting of a layer coated with a microcapsule enclosing a pigment or dye is formed on the outer periphery of the position to be jointed, where the pressure-sensitive color developing zone is coated with a transparent or translucent laminate layer.

In addition, as an inspection agent that is used for the die contact inspections, rubbing inspection, and the like in metal processing, a paste-like product in which a pigment is formulated, such as SHINMYOTAN (trade name; registered trade mark, manufactured by NAKATANI Co., Ltd.) is on the market.

SUMMARY OF THE INVENTION

Materials of which color tone changes in response to pressure have been proposed in the related art and have come to be widely used in various fields. For example, JP2009-19949A discloses a material for pressure measurement capable of achieving a density that can be visible or read with a minute pressure.

On the other hand, the surface shape of a pressure measuring object has not only a planar surface but also various shapes such as a curved surface and an uneven surface. Accordingly, regarding the material for pressure measurement, having a form such as a film or a sheet, there has been a case where the followability of the material for pressure measurement with respect to a measuring object surface of the measuring object having a surface shape other than the plane shape cannot be obtained, and thus the pressure distribution measurement is difficult.

Further, in the case of the form in which a colorant (a pigment or a dye) is enclosed in a microcapsule as in JP1993-123347A (JP-H5-123347A) and JP2004-116554A, it is difficult to obtain a good color development distribution (that is, a good density gradation) that responds to a pressure difference. Even in the case of the paste-like product in which a pigment is formulated, the density gradation cannot be obtained, and the pressure distribution cannot be checked.

An object to be achieved by an embodiment of the present disclosure is to provide a paste-like composition for pressure measurement, with which a pressure distribution measurement is possible without depending on the shape of a measuring object.

Another object to be achieved by another embodiment of the present disclosure is to provide a pressure measurement method using the above-described paste-like composition for pressure measurement.

The present disclosure includes the following aspects.

<1> A paste-like composition for pressure measurement, comprising a microcapsule that encompasses an electron-donating dye precursor and an electron-accepting compound that causes the electron-donating dye precursor to develop a color.

<2> The paste-like composition for pressure measurement according to <1>, in which a viscosity at 25° C. is 5,000 mPa·s or more.

<3> The paste-like composition for pressure measurement according to <1> or <2>, in which a content ratio of the microcapsule to the electron-accepting compound is in a range of 1:0.5 to 1:5.0 on a mass basis.

<4> The paste-like composition for pressure measurement according to any one of <1> to <3>, in which the paste-like composition contains a solvent having a boiling point of 100° C. or higher.

<5> The paste-like composition for pressure measurement according to any one of <1> to <4>, in which the paste-like composition contains at least one solvent selected from water, mineral oil, isoparaffin, silicone oil, or a fatty acid ester.

<6> The paste-like composition for pressure measurement according to any one of <1> to <5>, in which the microcapsule encompasses a solvent having an aromatic group, and a solvent contained outside the microcapsule contains a solvent having no aromatic group.

<7> The paste-like composition for pressure measurement according to any one of <4> to <6>, in which a content of the solvent contained outside the microcapsule is 10% by mass to 90% by mass with respect to a total mass of the paste-like composition.

<8> The paste-like composition for pressure measurement according to any one of <1> to <7>, in which the paste-like composition contains a thickener.

<9> The paste-like composition for pressure measurement according to any one of <1> to <8>, in which the paste-like composition contains a coloring agent.

<10> A pressure measurement method using the paste-like composition for pressure measurement according to any one of <1> to <9>.

According to an embodiment of the present disclosure, a paste-like composition for pressure measurement, with which a pressure distribution measurement is possible without depending on the shape of a measuring object, is provided.

According to another embodiment of the present disclosure, a pressure measurement method using the above-described paste-like composition for pressure measurement is provided.

DESCRIPTION OF THE PREFERRED EMBODIMENTS

Hereinafter, an example of a paste-like composition for pressure measurement of the present disclosure and an example of an embodiment of a pressure measurement method using the same will be described in detail. The paste-like composition for pressure measurement and the pressure measurement method, according to the embodiments of the present disclosure, are not limited to the following embodiments and can be embodied by being appropriated modified within the scope of the object of the present disclosure.

A range of numerical values shown using "to" in the disclosure means a range including numerical values before and after "to" as a minimum value and a maximum value.

In the range of numerical values disclosed stepwise in the disclosure, an upper limit value and a lower limit value disclosed in a certain range of numerical values may be replaced with an upper limit value and a lower limit value disclosed in another range of numerical values disclosed in stepwise. In addition, in the range of numerical values disclosed in the disclosure, an upper limit value and a lower limit value disclosed in a certain range of numerical values may be replaced with values shown in examples.

In the disclosure, a combination of two or more preferred aspects is a more preferred aspect.

In the disclosure, in a case where plural kinds of substances corresponding to each component are present, the content of each component means a content of all of the plural kinds of substances, unless otherwise noted.

[Paste-Like Composition for Pressure Measurement]

A paste-like composition for pressure measurement of the present disclosure (hereinafter, also simply referred to as a "paste-like composition") is a paste-like composition for pressure measurement, including a microcapsule encompassing an electron-donating dye precursor (hereinafter, also simply referred to as a "microcapsule") and an electron-accepting compound (hereinafter, also simply referred to as an "electron-accepting compound") that causes the electron-donating dye precursor to develop a color.

The paste-like composition of the present disclosure develops a color in a case where the electron-donating dye precursor encompassed by the microcapsule comes into contact with the electron-accepting compound which is a color developer that causes the electron-donating dye precursor to develop a color.

The paste-like composition of the present disclosure enables a pressure distribution measurement without depending on the shape of a measuring object. That is, according to the paste-like composition of the present disclosure, it is possible to coat, with good uniformity, a measuring object with the composition of an amount required for measuring a region to be measured without depending on the surface shape of the measuring object which is difficult to be measured in the conventional form such as a film or a sheet. Furthermore, since the paste-like composition of the present disclosure utilizes a color developing reaction between the electron-donating dye precursor and the electron-accepting compound, a good color development distribution (that is, a good density gradation) that responds to a pressure difference can be obtained, which has been difficult in such an aspect in which the state of transfer of a paste containing a coloring material to a measuring object is visually checked or an aspect in which a microcapsule enclosing a coloration material such as a pigment or a dye are is broken by pressure to color a measuring object.

In the present disclosure, the paste-like composition for pressure measurement refers to a composition with which any surface of a measuring object can be coated to spread to form a coating film having a thickness that allows a pressure measurement and the pressure measurement can be carried out while maintaining a state where the form of the coating film at the time of being formed by coating is maintained.

Specifically, in the present disclosure, the fact that the composition for pressure measurement is paste-like is determined by the following indicator that in a case where a protruding surface of a dish-shaped iron plate made of a stainless steel (SUS304), having a diameter of 15 cm and a curvature of 30 cm, is coated with a composition for pressure measurement at a coating amount of 20 g/m$^2$, and the coated dish-shaped iron plate is allowed to stand in an environment of 25° C. and 50 RH for 1 hour, the coating film is maintained in the form at the time of being formed by coating, and the change (for example, dripping flow, the change in film thickness, or the like) in the form of the coating film is not visible even in a case where the dish-shaped iron plate is tilted by 90° with respect to the horizontal direction.

The viscosity of the paste-like composition of the present disclosure at 25° C. can be 2,000 mPa·s or more and is preferably 5,000 mPa·s or more from the viewpoint of making paste-like. In a case where the viscosity of the paste-like composition is 5,000 mPa·s or more, a more uniform coating is possible without depending on the shape of a measuring object, whereby the pressure distribution can be checked more accurately.

The upper limit of the viscosity can be 100,000 mPa·s or less from the viewpoint of coatability.

The viscosity of the paste-like composition can be adjusted with, for example, the kind and the content of each of the components contained in the paste-like composition.

For example, a suitable aspect of the paste-like composition of the present disclosure is an aspect containing at least one solvent (hereinafter, also referred to as a "specific solvent") selected from water, mineral oil, isoparaffin, silicone oil, or a fatty acid ester. The selection of the kind of specific solvent can contribute to the adjustment of the viscosity of the paste-like composition.

The viscosity in the present disclosure is a value measured by an E-type viscometer at 25° C. As the E-type viscometer, VISCOSITY METER TVB-10H (manufactured by TOKI SANGYO Co., Ltd.) can be used.

Specifically, the viscosity of the paste-like composition of the present disclosure can be measured by the following measuring equipment and measurement conditions.

—Measuring Equipment and Measurement Conditions—

1 g of a paste-like composition is placed in a cup of an E-type viscometer, a cone matching with the viscosity is selected, and the measurement is carried out at 25° C. The value 1 minute after the cone starts to rotate and the viscosity value stabilizes is defined as the viscosity.

In the paste-like composition of the present disclosure, the content ratio (the microcapsule:the electron-accepting compound) of the microcapsule to the electron-accepting compound can be in a range of 1:0.3 to 1:5.2 on the mass basis, and from the viewpoint of the color developability and the change in color development distribution, the content ratio thereof is preferably in a range of 1:0.5 to 1:5.0.

Details of the microcapsule, the electron-donating dye precursor, the electron-accepting compound, and the like will be described later.

<Microcapsule>

The paste-like composition of the present disclosure contains a microcapsule encompassing an electron-donating dye precursor.

The microcapsule consists of a capsule wall (hereinafter, also referred to as a "shell") and a component encompassed in the capsule wall (hereinafter, also referred to as a "capsule encompassed substance" or a "core").

Hereinafter, the capsule wall and the capsule encompassed substance will be described in detail.

(CAPSULE WALL)

Examples of the wall material contained in the capsule wall of the microcapsule include polyethylene, polystyrene, polyvinyl, polyurethane, polyurea, and polyurethane polyurea.

From the viewpoint of storage stability, the wall material contained in the capsule wall preferably contains a polymer obtained by using an isocyanate compound and an organic solvent, more preferably contains a polymer having at least one of a urethane bond or a urea bond, and still more preferably contains polyurethane polyurea.

(Capsule Encompassed Substance)

—Electron-Donating Dye Precursor—

The microcapsule encompasses an electron-donating dye precursor.

The electron-donating dye precursor can be used without particular limitation as long as it has the property of donating an electron or receiving a proton (a hydrogen ion; $H^+$) such as an acid to develop a color, and it is preferably colorless.

Particularly, the electron-donating dye precursor is preferably a colorless compound that has a partial skeleton such as lactone, lactam, sultone, spiropyran, ester, or amide, which undergoes ring opening or cleavage in a case where the electron-donating dye precursor comes into contact with the electron-accepting compound which will be described later.

Examples of the electron-donating dye precursor include compounds such as a triphenylmethanephthalide-based compound, a fluoran-based compound, a phenothiazine-based compound, an indolylphthalide-based compound, a leucoauramine-based compound, a rhodamine lactam-based compound, a triphenylmethane-based compound, a diphenylmethane-based compound, a triazene-based compound, a spiropyran-based compound, a fluorene-based compound, a pyridine-based compound, and a pyrazine-based compound.

For details of these compounds, the description of JP1993-257272A (JP-H5-257272A) can be referred to.

The microcapsule may encompass only one kind of electron-donating dye precursor or may encompass two or more kinds thereof from the viewpoint of the color tone adjustment and the like.

From the viewpoint of color developability, the encompassment rate of the electron-donating dye precursor in the microcapsule is, for example, preferably 1% by mass to 100% by mass, more preferably 5% by mass to 99% by mass, and still more preferably 10% by mass to 98% by mass, with respect to the total mass of the encompassed substance of the microcapsule.

—Solvent—

The microcapsule may encompass a solvent (a so-called oil component).

As the solvent, a compound known as an oil component can be used in use applications such as thermal recording paper and pressure-sensitive copying paper.

Examples of the solvent include aromatic hydrocarbons such as an alkyl naphthalene compound such as diisopropyl naphthalene, a diaryl alkane-based compound such as 1-phenyl-1-xylyl ethane, an alkyl biphenyl-based compound such as isopropyl biphenyl, a triaryl methane-based compound, an alkylbenzene-based compound, a benzyl naphthalene-based compound, a diaryl alkylene-based compound, and an aryl indane-based compound; aliphatic hydrocarbons such as dibutyl phthalate and an isoparaffin; natural animal and vegetable oils such as soybean oil, corn oil, cottonseed oil, rapeseed oil, olive oil, palm oil, castor oil, and fish oil; and high boiling point fractions of natural substances such as mineral oil.

From the viewpoint of dissolving the electron-donating dye precursor, the solvent encompassed by the microcapsule preferably contains a solvent having an aromatic group and is more preferably the above-described aromatic hydrocarbon.

In a case of encompassing a solvent, the microcapsule may encompass only one kind of solvent or may encompass two or more kinds thereof.

The encompassment rate of the solvent in the microcapsule is not particularly limited and can be appropriately set. For example, the encompassment rate of the solvent in the microcapsule can be in a range of 5% by mass to 90% by mass with respect to the total mass of the microcapsule encompassed substance.

[Other Components]

The microcapsule may encompass components other than the electron-donating colorless dye and the solvent which is an optional component.

Examples of the other components include various additives such as an ultraviolet absorbing agent, a light stabilizing agent, an antioxidant, wax, and an odor suppressant, and an auxiliary solvent. The auxiliary solvent will be described later.

The kind and the encompassment rate of the additive in the microcapsule is not particularly limited and can be appropriately set.

The median diameter of the microcapsule in the volume standard is not particularly limited and can be appropriately set. For example, the median diameter of the microcapsule in the volume standard can be in a range of 0.1 μm to 200 μm.

Specifically, the median diameter of the microcapsule in the volume standard in the paste-like composition is measured by the following method.

A paste-like composition is applied onto any support to form a coating film. The surface of the obtained coating film is microphotographed with an optical microscope at a magnification of 150 times, and the sizes of all microcapsules within a randomly set range of 2 cm×2 cm are measured and calculated.

The number average wall thickness of the microcapsule is not particularly limited and can be appropriately set depending on the use application of the paste-like composition.

The number average wall thickness of the microcapsule depends on various conditions such as the kind of wall material of the capsule, the encompassment amount of the capsule encompassed substance, the particle diameter of the capsule, and the like; however, it can be, for example, in a range of 10 nm to 1,000 nm.

The "number average wall thickness of the microcapsule" referred to in the present disclosure refers to a thickness (unit: nm) of a resin film (a so-called capsule wall) that forms a capsule particle of the microcapsule, and the "number average wall thickness" refers to a value obtained by determining the thicknesses (unit: nm) of the individual capsule walls of the five microcapsules with a scanning electron microscope (SEM) and averaging them.

Specifically, the number average wall thickness of the microcapsule is measured by the following method.

First, a paste-like composition is applied onto any support to form a coating film. A cross-sectional slice of the obtained coating film is formed, the formed cross-section is observed using SEM, and any five microcapsules are selected. The cross-section of each of the selected microcapsules is observed, the thicknesses of the capsule walls are measured, and the average value thereof is calculated.

The wall thickness of the microcapsule (the thickness of the capsule wall) is governed by the relationship among the capsule wall, the encompassed substance, and the particle diameter of the microcapsule, as represented by the following expression, and can be adjusted with the particle diameter of the microcapsule (the average primary particle diameter), the density (the wall density) of the capsule wall, the amounts of the solute, the solvent, and the auxiliary solvent, which are encompassed by the microcapsule, the densities of the solute, the solvent, and the auxiliary solvent, which are encompassed by the microcapsule, and the amount of the wall material (the wall material amount).

Specifically, for example, the thickness of the capsule wall can be adjusted to be thin by increasing the amounts of the solute, the solvent, and the auxiliary solvent (that is, the encompassed substances), which are encompassed by the microcapsule.

$$\delta = D \times 10^3/2 \times \{[(S \times \rho + W \times \gamma \times G)/(S \times \rho)]^{1/3} - 1\} \quad \text{Embedded expression 01}$$

δ: Thickness of capsule wall [nm]
D: Particle diameter of microcapsule [μm]
S: Amount of solute, solvent, and auxiliary solvent, encompassed by microcapsule [kg]
ρ: Wall density [kg/L]
W: Wall material amount [kg]
γ: Reaction rate [−]
G: Density of solute, solvent, and auxiliary solvent, encompassed by microcapsule [kg/L]

The content of the microcapsule contained in the paste-like composition is preferably 5% by mass to 50% by mass and more preferably 10% by mass to 30% by mass with respect to the total mass of the paste-like composition.

<Electron-Accepting Compound>

Examples of the electron-accepting compound include a clay substance such as activated clay, acid clay, attapulgite, zeolite, bentonite, or kaolin, a phenol-based compound, and a hydroxybenzoic acid ester.

Specific examples of the electron-accepting compound include 2,2-bis(4-hydroxyphenyl)propane [also known as bisphenol A], 2,2-bis(4-hydroxyphenyl)hexafluoropropane [also known as bisphenol AF], 2,2-bis(p-hydroxyphenyl)pentane, 2,2-bis(p-hydroxyphenyl)ethane, 2,2-bis(p-hydroxyphenyl)butane, 2,2-bis(4'-hydroxy-3',5'-dichlorophenyl)propane, 1,1-(p-hydroxyphenyl)cyclohexane, 1,1-(p-hydroxyphenyl)propane, 1,1-(p-hydroxyphenyl)pentane, 1,1-(p-hydroxyphenyl)-2-ethylhexane, 3,5-bis(α-methylbenzyl)salicylic acid and a polyvalent metal salt thereof, 3,5-di-(tert-butyl)salicylic acid and a polyvalent metal salt thereof, 3-α,α-dimethylbenzyl salicylic acid and a polyvalent metal salt thereof, butyl p-hydroxybenzoate, benzyl p-hydroxybenzoate, 2-ethylhexyl p-hydroxybenzoate, p-phenyl phenol, and p-cumyl phenol.

The electron-accepting compound also includes the compounds represented by General Formula (1) described in paragraphs 0051 to 0060 of WO2018/199044A1A.

Among these, the electron-accepting compound is preferably at least one selected from the group consisting of activated clay, acid clay, kaolin, a phenol-based compound (for example, a bisphenol-based compound), a salicylic acid-based compound, and a hydroxybenzoic acid ester, and more preferably at least one selected from the group consisting of activated clay, a bisphenol-based compound, and a salicylic acid-based compound. From the viewpoint of more excellent color developability, the electron-accepting compound is particularly preferably activated clay.

The shape of the particle of the electron-accepting compound is not particularly limited and may be any shape such as a spherical shape, an elliptical shape, a square shape, a needle shape, and an indefinite shape. The same applies in a case where the particle of the electron-accepting compound is an aggregate of a plurality of particles.

The paste-like composition of the present disclosure may contain only one type of electron-accepting compound or may contain two or more kinds thereof.

In addition, the content of the electron-accepting compound in the paste-like composition of the present disclosure is not particularly limited; however, it is, for example, preferably 30 parts by mass to 3,000 parts by mass and more preferably 50 parts by mass to 1,500 parts by mass with respect to 100 parts by mass of the electron-donating dye precursor from the viewpoint of color optical density.

<Solvent>

The paste-like composition of the present disclosure preferably contains a solvent. Unless otherwise specified, the solvent referred to here is a solvent contained outside the microcapsule.

The solvent is not particularly limited as long as it does not swell the capsule wall (the shell) of the microcapsule and does not exude or release the capsule encompassed substance (the core) from the inside of the capsule, and a known solvent can be used.

From the viewpoint of not swelling the capsule wall (the shell) of the microcapsule and not exuding or releasing the capsule encompassed substance (the core) from the inside of the capsule, the solvent contained outside the microcapsule preferably contains a solvent having no aromatic group. Further, it is preferable that a solvent having an aromatic group is encompassed by the microcapsule and the above solvent contained outside the microcapsule (that is, the solvent that is not encompassed by the microcapsule) contains a solvent having no aromatic group.

Further, from the viewpoint of keeping the viscosity constant, the boiling point of the solvent is preferably 100° C. or higher. The upper limit thereof is, for example, 500° C.

The paste-like composition preferably contains at least one solvent (a specific solvent) selected from water, mineral oil, isoparaffin, silicone oil, and a fatty acid ester, and more preferably at least one selected from water, mineral oil, and isoparaffin. Mineral oil, silicone oil, and a fatty acid ester preferably have no aromatic group.

Hereinafter, mineral oil, isoparaffin, silicone oil, and a fatty acid ester may be collectively referred to as "specific oil agents" as appropriate.

In a case where the paste-like composition contains at least one solvent (a specific solvent) selected from water and the specific oil agents, a more uniform coating is possible without depending on the shape of a measuring object.

One solvent or two or more solvents can be selected in consideration of the kind of the measuring object, the needs of the user, and the like.

One of the suitable aspects of the paste-like composition of the present disclosure is an aspect containing one or more solvents selected from the specific oil agents as a solvent. In a case of selecting two or more specific oil agents, the specific oil agents to be selected may be only any one of mineral oil, isoparaffin, silicone oil, and a fatty acid ester (for example, two kinds are selected from mineral oil), or mineral oil, isoparaffin, silicone oil, and a fatty acid ester may be combined to form two or more kinds.

For example, the selection of the specific oil agent is preferable from the viewpoint of suppressing the rust occurrence and the like in a case where the measuring object is made of metal.

In addition, another suitable aspect of the paste-like composition of the present disclosure is an aspect containing water as a solvent. For example, water may be selected for the needs of avoiding the use of an oil agent.

~Specific Oil Agents~

Examples of the mineral oil include hydrocarbons derived from minerals such as mineral oil (also known as liquid paraffin) and solid paraffin having a melting point of 40° C. to 70° C. Isoparaffin is not included in the mineral oil. As the mineral oil, a commercially available mineral oil may be used, and examples thereof include liquid paraffin (density (20° C.): 0.825 to 0.850 g/mL, density (20° C.): 0.815 to 0.840 g/mL, and density (20° C.): 0. 800 to 0.835 g/mL, FUJIFILM Wako Pure Chemical Corporation), and paraffin (melting point: 48° C. to 50° C., melting point: 42° C. to 44° C., melting point: 52° C. to 54° C., melting point: 54° C. to 56° C., melting point: 56° C. to 58° C., melting point: 58° C. to 60° C., melting point: 60° C. to 62° C., melting point: 62° C. to 64° C., melting point: 64° C. to 66° C., melting point: 66° C. to 68° C., and melting point: 68° C. to 70° C., FUJIFILM Wako Pure Chemical Corporation).

Examples of the isoparaffin include a branched hydrocarbon having 10 to 30 carbon atoms. As the isoparaffin, a commercially available product may be used, and examples thereof include IP Solvent 1016, 1620, LX, 2028, and 2835 (synthetic isoparaffin, Idemitsu Kosan Co., Ltd.).

Examples of the silicone oil include a linear or branched polysiloxane, and a polysiloxane having a dimethylsiloxane structure (—Si(CH$_3$)$_2$—O—) as a main constituent is preferable. As the silicone oil, a commercially available product may be used, and examples thereof include silicone oil KF series (Shin-Etsu Chemical Co., Ltd.) such as KF-96, 69, 99, 50, 54, 965, and 968.

The fatty acid ester may be an ester obtained by carrying out dehydration condensation of a fatty acid and an alcohol. The fatty acid in the fatty acid ester may be a saturated fatty acid or an unsaturated fatty acid and is preferably a fatty acid having 8 to 20 carbon atoms. Examples of the suitable fatty acid ester include a glycerin fatty acid ester, a polyglycerin fatty acid ester, and a higher alcohol fatty acid ester. As the fatty acid ester, a commercially available product may be used, and examples thereof include the SALACOS series (Nisshin OilliO Group, Ltd.) such as SALACOS HG-8 (polyglyceryl-6 octacaprylate) and SALACOS P-8 (ethylhexyl palmitate).

~Water~

The water is not particularly limited, pure water, distilled water, ion-exchanged water, or the like can be used, and distilled water is preferable from the viewpoint of temporal stability.

The content of the solvent in the paste-like composition is preferably 10% by mass to 90% by mass, more preferably 20% by mass to 80% by mass, and still more preferably 20% by mass to 70% by mass, with respect to the total mass of the paste-like composition.

<Thickener>

The paste-like composition may contain at least one thickener.

In a case where a thickener is contained, the viscosity of the paste-like composition is increased, and the viscosity of the paste-like composition can be easily adjusted depending on the coatability of a measuring object.

In a case where water is contained as the solvent, the containing of a thickener is preferable since the viscosity of the paste-like composition can be adjusted more easily.

The thickener is not particularly limited as long as it exhibits a thickening effect in a case of being contained in the paste-like composition of the present disclosure, and a known thickener can be used. The form of the thickener is also not limited and may be a particle or a polymer.

Examples of the thickener include polysaccharides containing a cellulose compound (for example, carboxymethyl cellulose, hydroxypropylmethyl cellulose, methyl cellulose, hydroxyethylmethyl cellulose, or a salt thereof), gelatin, and an acrylic polymer.

As the thickener, a commercially available product may be used, and examples thereof include CELLOGEN EP (carboxymethyl cellulose Na, DKS Co., Ltd.) and METOLOSE SH60SH (hydroxypropyl methyl cellulose, Shin-Etsu Chemical Co., Ltd.).

The content of the thickener can be appropriately set depending on the kind of solvent, the desired thickening effect, and the like. For example, it can be 0.01% by mass to 2% by mass with respect to the total mass of the paste-like composition.

<Coloring Agent>

The paste-like composition may contain at least one coloring agent.

In a case where the paste-like composition contains a coloring agent, the thickness unevenness of the coating film is easily checked, and thus more accurate pressure measurement is possible, in a case where a measuring object is coated with the paste-like composition.

For this reason, as the coloring agent, it is preferable to select a coloring agent that exhibits a color tone different from the color tone developed by the reaction between the electron-donating dye precursor and the electron-accepting compound.

Examples of the coloring agent include a dye and a pigment, and a known dye and a known pigment (an organic pigment or inorganic pigment) can be used. From the viewpoint of temporal stability, a pigment is preferable. As the coloring agent, a commercially available product may be used.

Examples of the coloring agent include a polycyclic pigment represented by a phthalocyanine pigment, and an azo pigment.

The content of the coloring agent can be appropriately set in consideration of visibility and can be, for example, 0.01% by mass to 0.5% by mass with respect to the total mass of the paste-like composition.

<Another Component>

The paste-like composition of the present disclosure may contain another component such as a surfactant, a fluorescent whitening agent, an antifoaming agent, a permeation agent, an ultraviolet absorbing agent, or a preservative.

[Production of Paste-Like Composition]

The method of producing the paste-like composition of the present disclosure is not particularly limited as long as the above-described paste-like composition can be produced.

The kinds of the components contained in the paste-like composition, such as the electron-donating dye precursor, the electron-accepting compound, the solvent, the thickener, and the coloring agent, and the preferred aspects thereof are as described above, and hereinafter, the description thereof will be omitted.

The paste-like composition of the present disclosure is preferably produced, for example, by mixing a microcapsule encompassing an electron-donating dye precursor, an electron-accepting compound, preferably a solvent (more preferably a specific solvent), and optional components such as a thickener and a coloring agent, and kneading the obtained mixture.

The microcapsule of the present disclosure can be produced by any known method such as interfacial polymerization, internal polymerization, phase separation, external polymerization, or coacervation. Regarding the method of producing a microcapsule, for example, the method described in paragraphs 0078 to 0103 of WO2018/199044A can be referred to.

For the production of the paste-like composition, a powdered microcapsule (hereinafter, also referred to as a "powdered capsule") may be used, or a slurry (hereinafter, also referred to as a "capsule slurry") containing a microcapsule may be used.

In a case where the specific oil agent is used as the solvent, it is preferable to use a powdered capsule. In a case where a powdered capsule is used, the specific oil agent and the microcapsule can be easily mixed.

Further, the powdered capsule may be in the form obtained by powderizing only the microcapsule or may be in the form of a composite particle in which a microcapsule is attached to at least a part of the surface of the particle of the electron-accepting compound. For examples of the composite particle, the stimulus-responsive composite particle described in WO2018/016502A can be referred to.

Examples of the method of powderizing a microcapsule include a fluidized bed granulation method and a spray-drying method. The microcapsule can be powdered, for example, according to the methods described in paragraphs 0068 to 0076 and paragraphs 0106 to 0113 of WO2018/016502A.

The slurry (the capsule slurry) containing a microcapsule can be prepared, for example, by concentrating the microcapsule liquid obtained in the above-described method of producing a microcapsule by using a known concentration unit such as a centrifuge.

From the viewpoint of obtaining good color developability, the concentration of the microcapsule in the capsule slurry is preferably 10% by mass or more and may be, for example, 10% by mass to 80% by mass.

The liquid component (for example, water) contained in the capsule slurry can be a part or all of the solvent contained in the paste-like composition.

Mixing of individual components contained in the paste-like composition may be carried out by simple mixing.

That is, the entire amount of individual components contained in the paste-like composition may be mixed at once, or the individual components may be gradually mixed little by little.

As a unit for kneading the mixture, a known unit can be used, and for example, a device such as a kneader or a mixer can be used.

<Matters Relating to Pressure Measurement>

The pressure measurement using the paste-like composition of the present disclosure can be carried out by coating a location, where the pressure or the pressure distribution is to be measured, with the paste-like composition and then, in this state, applying pressure to the paste-like composition.

The present disclosure includes a pressure measurement method using the paste-like composition of the present disclosure. More specifically, the pressure measurement method of the present disclosure can be a pressure measurement method which includes coating a measurement surface of a measuring object with the paste-like composition of the present disclosure to form a coating film and applying pressure to the formed coating film so that the coating film develop a color.

The pressure may be any one of point pressure, linear pressure, or surface pressure.

The shape of the measurement surface of the measuring object is not particularly limited, and examples thereof include a planar surface, a curved surface, and an uneven surface, and various shapes can be used as the measurement surface. The measurement surface for the pressure measurement may be a part or the entire surface of a measuring object.

One of the suitable aspects of the paste-like composition of the present disclosure is an aspect in which the pressure or the pressure distribution in a measuring object having a curved surface is measured with the paste-like composition.

In addition, one of the suitable aspects of the pressure measurement method using the paste-like composition of the present disclosure is an aspect in which the pressure or the pressure distribution in a measuring object having a curved surface is measured with the pressure measurement method.

Various known coating methods can be used for coating the paste-like composition, and examples thereof include, but are not limited to, roller coating, brush coating, and dip coating.

The aspect of coating can be an aspect in which a measurement surface of a measuring object can be directly coated with the paste-like composition. Further, an aspect in which an interposed object (for example, a film or the like) arranged for the measurement of a measuring object is coated with the paste-like composition can be adopted.

The coating amount of the paste-like composition can be set depending on the measurement application; however, from the viewpoint of obtaining good color development and good color development distribution, for example, it can be preferably set to 10 $g/m^2$ to 40 $g/m^2$.

The paste-like composition of the present disclosure can reproduce a visible or readable density and density gradation in a case where a pressure is applied to develop a color. The color optical density can be measured using a reflection densitometer (for example, RD-191 manufactured by GretagMacbeth GmbH).

Further, the paste-like composition of the present disclosure exhibits a property that the color optical density increases as the pressure increases, that is, a gradation property of color development, preferably in a case where a pressure of 1 MPa to 100 MPa is applied. The preferred gradation property of color development in the paste-like composition of the present disclosure is a property that the color optical density linearly increases as the pressure increases (that is, the pressure is proportional to the color optical density).

The pressure range that can be measured by the paste-like composition of the present disclosure can be appropriately set depending on the measurement application. For example, in some aspect of the paste-like composition of the present disclosure, an aspect in which the paste-like composition is used for the pressure measurement in a range of 5 MPa to 100 MPa can be adopted.

The range of pressure to be measured can be adjusted, for example, by controlling the particle diameter, wall thickness, constituent materials, and the like of the microcapsule, and by the coating amount.

Further, the article which is a measuring object is not particularly limited as long as it has a shape in which pressure or pressure distribution can be measured. Examples thereof include, but are not limited to, various forming molds including a press mold, a vacuum forming mold, and an injection forming mold.

The use application of the paste-like composition of the present disclosure includes, but is not limited to, the following use examples in various fields. Some of the uses exemplified below may overlap each other.

The use examples include the production of vehicles such as an automobile or an aircraft (for example, checking the pressure distribution in forming processing of various constituent members and a body and in assembly processing of constituent members), the construction (for example, checking the pressure distribution in assembly processing of building materials), the production of electronic products (for example, checking the pressure distribution in curved surface machining (bonding of a curved screen display or the like)), the transport (for example, checking the impact force applied to cargo due to transport), the metal processing (for example, checking the mold contact in the production of various metal products), the molding of resin products (for example, checking the mold contact during molding of resin products), the molding of pharmaceuticals (for example, checking the pressure distribution in making tablets), the furniture (for example, checking the pressure distribution on the surface of furniture (such as the seat of a chair, sofa, and the like)), the stationery (for example, checking the grip force applied to writing materials and the like), the sports equipment (for example, checking the impact force applied to an article (such as a ball) constituted of an elastic material), and the dental articles (for example, checking the gap (the clearance) between upper and lower teeth).

The pressure measurement using the paste-like composition of the present disclosure can be suitably used for, for example, checking the mold contact in metal processing, checking the pressure distribution at the time of bonding a curved screen display, and the like.

EXAMPLES

Hereinafter, the paste-like composition according to the present disclosure will be described in more detail with reference to Examples; however, the paste-like composition according to the present disclosure is not limited to the following Examples as long as the gist thereof is not exceeded. Unless otherwise specified, "%" and "parts" are on the mass basis.

Example 1

—Preparation of Electron-Donating Dye Precursor Encompassing Microcapsule Liquid—

2.9 parts of the following compound (A) (an indolylphthalide-based compound) which is an electron-donating dye precursor and 4.1 parts of the following compound (B) (an indolylphthalide-based compound) which is an electron-donating dye precursor were dissolved in 56.4 parts of a linear alkyl benzene (trade name: Grade Alken L, JX Nippon Oil & Energy Corporation) to obtain a solution A.

Next, 14.2 parts of synthetic isoparaffin (trade name: IP SOLVENT 1620, an isoparaffin-based solvent, Idemitsu Kosan Co., Ltd.; a solvent (oil)) and 0.9 parts of N,N,N',N'-tetrakis(2-hydroxypropyl)ethylenediamine (trade name: ADECA POLYETHER EDP-300, ADEKA CORPORATION; a wall material), which had been dissolved in 6.8 parts of methyl ethyl ketone (an auxiliary solvent), were added to the solution A under stirring to obtain a solution B.

Next, 9.1 parts of a trimethylolpropane adduct (trade name: BURNOCK (registered trade mark) D-750 (a trifunctional isocyanate), DIC Corporation; a wall material) of tolylene diisocyanate, which had been dissolved in 22.8 parts of methyl ethyl ketone (an auxiliary solvent), were added to the solution B under stirring to obtain a solution C (oil phase).

Next, the solution C obtained as described above was added to 135 parts (aqueous phase) of an aqueous solution of 5.8% polyvinyl alcohol (trade name: PVA-205, KURARAY Co., Ltd.; a dispersing agent) and mixed to obtain a mixed liquid, which was then subjected to emulsification. 230 parts of water were added to the obtained emulsified liquid, followed by heating to 75° C. while stirring, stirring for 2 hours, and then cooling.

Water was further added to the cooled liquid to adjust the concentration, thereby obtaining an electron-donating dye precursor encompassing microcapsule liquid having a solid content concentration of 20%.

Embedded chemical 1

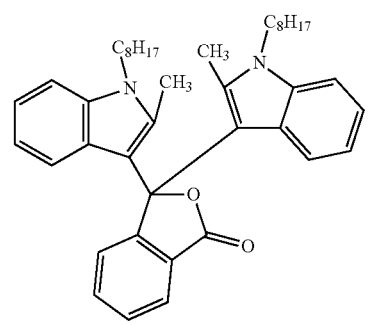

Compound (A)

-continued

Compound (B)

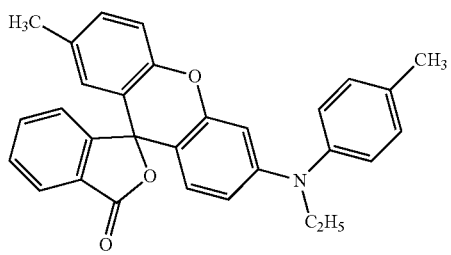

The median diameter of the electron-donating dye precursor encompassing microcapsule obtained as described above was 14 µm in the volume standard.

The median diameter of the electron-donating dye precursor encompassing microcapsule in the microcapsule-containing liquid in the volume standard was measured by using a laser diffraction/scattering-type particle size distribution analyzer (product name: MICROTRAC MT3300EXII, NIKKISO Co., Ltd.).

—Preparation of Powdered Microcapsule—

Next, the charge air temperature of a fluid bed granulator (model: FDMP-01, POWREX Corporation) was adjusted to 220° C., and the exhaust gas temperature was adjusted to 110° C. to 130° C., and then 250 parts of the electron-donating dye precursor encompassing microcapsule liquid obtained as described above were sprayed into the fluid bed granulator. After spraying, drying was carried out to obtain a powdered capsule A.

—Preparation of Paste-Like Composition—

10 parts of the powdered capsule A obtained as described above, 14.7 parts of activated clay (trade name: SILTON NCP, purity: 95%, an activated clay obtained by heat-treating acid clay with sulfuric acid, MIZUSAWA INDUSTRIAL CHEMICALS, Ltd.), which is an electron-accepting compound (a color developer), and 23.3 parts of mineral oil (liquid paraffin (mineral oil), manufactured by FUJIFILM Wako Pure Chemical Corporation) were mixed, and the obtained mixture was sufficiently kneaded to obtain a paste-like composition of Example 1. The median diameter of the microcapsule in the paste-like composition in the volume standard was 14 µm.

<Evaluation>

(Evaluation 1) Checking of Paste State

The protruding surface of a dish-shaped iron plate made of a stainless steel (SUS304), having a diameter of 15 cm and a curvature of 30 cm, was coated with the paste-like composition obtained as described above was by a coating amount of 20 g/m². When the dish-shaped iron plate after coating was allowed to stand in an environment of 25° C. and 50 RH for 1 hour and then the dish-shaped iron plate was tilted by 90° with respect to the horizontal direction, the form of the coating film at the time of being formed by coating was maintained, and the dripping flow of the composition was not visible.

(Evaluation 2) Viscosity Measurement

The viscosity of the paste-like composition obtained as described above was measured using an E-type viscometer. The measurement device and measurement conditions are as described above. The results are shown in Table 1.

(Evaluation 3) Evaluation of Color Developability by Pressurization

The protruding surface of a metal plate (10 cm×10 cm) made of a stainless steel (SUS304) was coated with the paste-like composition obtained as described above at a coating amount of 20 g/m². The same metal plate was placed on the coated surface so that the coating region was covered, and a press machine (product name: H1F35-1, manufactured by Komatsu Ltd.) was used to pressurize at a pressure of 10 MPa for 120 seconds.

After the pressurization was completed, the metal plate placed on the upper part was removed, the color development and the color development distribution of the coated region were visually checked, and the sensory evaluation was carried out according to the following evaluation standards. The results are shown in Table 1.

<Color Development>

A: The color is developed at a sufficient visible density.

B: The density of the developed color is slightly low; however, the color is developed to the extent that there is no problem in practical use.

C: No color is developed.

<Color Development Distribution>

A: The color development distribution can be visible at a sufficient difference in color optical density.

B: The difference in color optical density is slightly low; however, the color development distribution can be visible to the extent that there is no problem in practical use.

C: The difference in color optical density cannot be visible.

Examples 2 and 14

The same operations as in Example 1 were carried out except that the amount and kind of each of the components used in Example 1 were changed as indicated in Table 1, thereby obtaining paste-like compositions of Examples 2 to 14.

A capsule slurry A used in Example 12 was prepared as follows.

—Preparation of Capsule Slurry A—

The electron-donating dye precursor encompassing microcapsule liquid prepared in Example 1 was subjected to a centrifugal separation treatment for 30 minutes using a desktop centrifuge 180500 (manufactured by AS ONE Corporation) under the condition of a rotation speed of 15,000 revolutions per minute (rpm, the same applies hereinafter) and further, diluted with distilled water to prepare the capsule slurry A having a solid content concentration of 50% by mass.

The median diameter of the microcapsule in the capsule slurry A in the volume standard was 14 µm.

When each of the obtained paste-like compositions was evaluated as indicated in "(Evaluation 1) Confirmation of paste state" described above, no dripping flow was visible in any one of the paste-like compositions. Further, each of the obtained paste-like compositions was subjected to "(Evaluation 2) Viscosity measurement" and "(Evaluation 3) Evaluation of color developability by pressurization", described above. The results are shown in Table 1.

Comparative Example 1

Instead of the paste-like composition obtained in Example 1, SHINMYOTAN (a paste containing a pigment, manufactured by NAKATANI Co., Ltd.) was subjected to the evaluations as indicated in "(Evaluation 2) Viscosity measurement" and "(Evaluation 3) Evaluation of color developability by pressurization". The results are shown in Table 1.

TABLE 1

| | Microcapsule | | Color developer | | Solvent | | Thickener | | Coloring agent | | Capsule/color developer ratio | Viscosity [mPa·s] | Color development | Color development distribution |
|---|---|---|---|---|---|---|---|---|---|---|---|---|---|---|
| | Form | Amount (part) | Kind | Amount (part) | Kind | Amount (part) | Kind | Amount (part) | Kind | Amount (part) | | | | |
| Example 1 | Powdered capsule A | 10 | Activated clay | 14.7 | Mineral oil | 23.3 | — | — | — | — | 1/1.4 | 12000 | A | A |
| Example 2 | Powdered capsule A | 10 | Activated clay | 14.7 | Mineral oil | 21.3 | — | — | — | — | 1/1.4 | 30000 | A | A |
| | | | | | Solid paraffin | 2.0 | — | — | — | — | | | A | A |
| Example 3 | Powdered capsule A | 10 | Activated clay | 14.7 | Mineral oil | 71.3 | — | — | — | — | 1/1.4 | 4500 | A | B |
| Example 4 | Powdered capsule A | 10 | Activated clay | 3.2 | Mineral oil | 12.8 | — | — | — | — | 1/0.3 | 9000 | B | A |
| Example 5 | Powdered capsule A | 10 | Activated clay | 10.5 | Mineral oil | 19.5 | — | — | — | — | 1/1.0 | 10500 | A | A |
| Example 6 | Powdered capsule A | 10 | Activated clay | 36.8 | Mineral oil | 43.2 | — | — | — | — | 1/3.5 | 40000 | A | A |
| Example 7 | Powdered capsule A | 10 | Activated clay | 54.7 | Mineral oil | 59.3 | — | — | — | — | 1/5.2 | 65000 | A | B |
| Example 8 | Powdered capsule A | 10 | Activated clay | 14.7 | Iso-paraffin | 23.3 | — | — | — | — | 1/1.4 | 7000 | A | A |
| Example 9 | Powdered capsule A | 10 | Activated clay | 14.7 | Silicone oil | 23.3 | — | — | — | — | 1/1.4 | 8000 | A | A |
| Example 10 | Powdered capsule A | 10 | Activated clay | 14.7 | Fatty acid ester | 23.3 | — | — | — | — | 1/1.4 | 9000 | A | A |
| Example 11 | Powdered capsule A | 10 | Activated clay | 14.7 | Distilled water | 23.3 | — | — | — | — | 1/1.4 | 6500 | A | A |
| Example 12 | Powdered capsule A | 20 | Activated clay | 14.7 | Distilled water | 13.3 | — | — | — | — | 1/1.4 | 7000 | A | A |
| Example 13 | Powdered capsule A | 10 | Activated clay | 14.7 | Distilled water | 17.3 | Thickener aqueous solution | 6 | — | — | 1/1.4 | 20000 | A | A |
| Example 14 | Powdered capsule A | 10 | Activated clay | 14.7 | Mineral oil | 23.3 | — | — | Pigment | 0.02 | 1/1.4 | 15000 | A | A |
| Comparative Example 1 | SHINMYOTAN (manufactured by NAKATANI Co., Ltd.) | | | | | | | | | | | 60000 | C | C |

In Table 1, "-" indicated in the "Component" column means that the corresponding component is not contained.

Details of the mineral oil, the solid paraffin, the silicone oil, the fatty acid ester, the thickener, and the pigment listed in Table 1 are as follows.

Mineral oil: liquid paraffin (density (20° C.): 0.825 to 0.850 g/mL, FUJIFILM Wako Pure Chemical Corporation)

Solid paraffin: paraffin (melting point: 48° C. to 50° C., FUJIFILM Wako Pure Chemical Corporation)

Isoparaffin: IP SOLVENT 1620 (Idemitsu Kosan Co., Ltd.)

Silicone oil: KF-96 (Shin-Etsu Chemical Co., Ltd.)

Fatty acid ester: SALACOS HG-8 (polyglyceryl-6 octacaprylate, Nisshin OilliO Group, Ltd.)

Thickener aqueous solution: an aqueous solution of 1% by mass CELLOGEN EP (carboxymethyl cellulose Na, DKS Co., Ltd.)

Pigment: phthalocyanine blue (a phthalocyanine pigment, FUJIFILM Wako Pure Chemical Corporation)

As confirmed in Evaluation 1, a measuring object having a curved surface could be coated well without dripping flow, with the paste-like compositions of Examples 1 to 14.

As shown in Table 1, it can be seen that each of the paste-like compositions of Examples is excellent in all the evaluations of the color developability (the color development and the color development distribution) by pressurization.

Further, from Examples 1 to 3, it can be seen that in a case where the viscosity of the paste-like composition is 5,000 mPa·s or more, more excellent color developability is exhibited.

Further, from Examples 4 to 7, it can be seen that the content ratio of the microcapsule contained in the paste-like composition to the electron-accepting compound (the color developer) is in a range of 1:0.5 to 1:5 on the mass basis, more excellent color developability is exhibited.

In Comparative Example 1, none of the color development and the color development distribution could be visible.

The contents of the disclosures of JP2019-057688 filed on Mar. 26, 2019, and JP2019-131068 filed on Jul. 16, 2019, are incorporated in the present specification by reference in their entirety.

All documents, patent applications, and technical standards described in the present specification are incorporated in the present specification by reference, to the same extent as in the case where each of the documents, patent applications, and technical standards is specifically and individually described.

What is claimed is:

1. A paste-like composition for pressure measurement, comprising:
   a microcapsule that encompasses an electron-donating dye precursor; and
   an electron-accepting compound that causes the electron-donating dye precursor to develop a color.

2. The paste-like composition for pressure measurement according to claim 1,
   wherein a viscosity at 25° C. is 5,000 mPa·s or more.

3. The paste-like composition for pressure measurement according to claim 1,
   wherein a content ratio of the microcapsule to the electron-accepting compound is in a range of 1:0.5 to 1:5.0 on a mass basis.

4. The paste-like composition for pressure measurement according to claim 1, wherein a viscosity at 25° C. is 5,000 mPa·s or more, and a content ratio of the microcapsule to the electron-accepting compound is in a range of 1:0.5 to 1:5.0 on a mass basis.

5. The paste-like composition for pressure measurement according to claim 1,
   wherein the paste-like composition contains a solvent having a boiling point of 100° C. or higher.

6. The paste-like composition for pressure measurement according to claim 1,
   wherein the paste-like composition contains at least one solvent selected from water, mineral oil, isoparaffin, silicone oil, or a fatty acid ester.

7. The paste-like composition for pressure measurement according to claim 1,
   wherein the microcapsule encompasses a solvent having an aromatic group, and
   a solvent contained outside the microcapsule contains a solvent having no aromatic group.

8. The paste-like composition for pressure measurement according to claim 5,
   wherein a content of the solvent contained outside the microcapsule is 10% by mass to 90% by mass with respect to a total mass of the paste-like composition.

9. The paste-like composition for pressure measurement according to claim 1,
   wherein the paste-like composition contains a thickener.

10. The paste-like composition for pressure measurement according to claim 1,
    wherein the paste-like composition contains a coloring agent.

11. A pressure measurement method, comprising:
    coating a measurement surface of a measuring object using the paste-like composition for pressure measurement according to claim 1 to form a coating film;
    applying pressure to the coating film so that the coating film develop a color; and measuring an optical density of the color on the coating film.

* * * * *